Sept. 23, 1958     O. G. DOUGLAS     2,853,198
LOG LOADING DEVICE

Filed Jan. 4, 1957                                   4 Sheets-Sheet 1

INVENTOR
OLLIE G. DOUGLAS

BY Wilkinson, Mawhinney & Theibault
ATTORNEYS

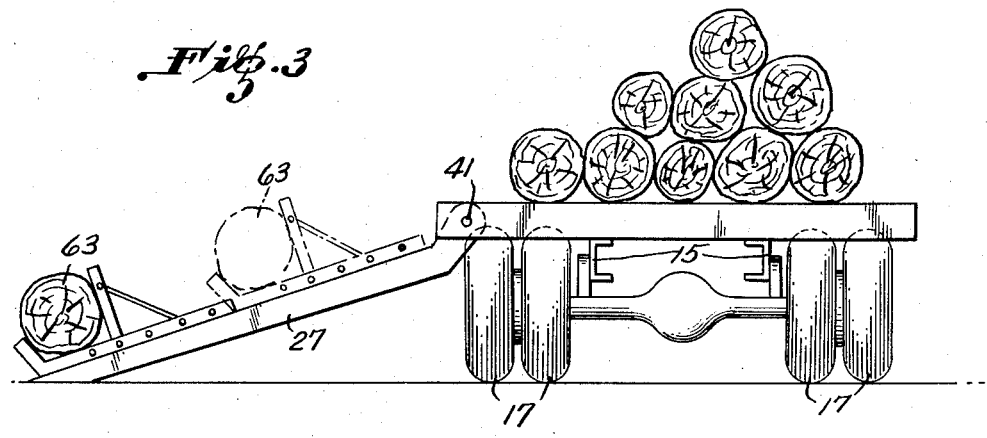
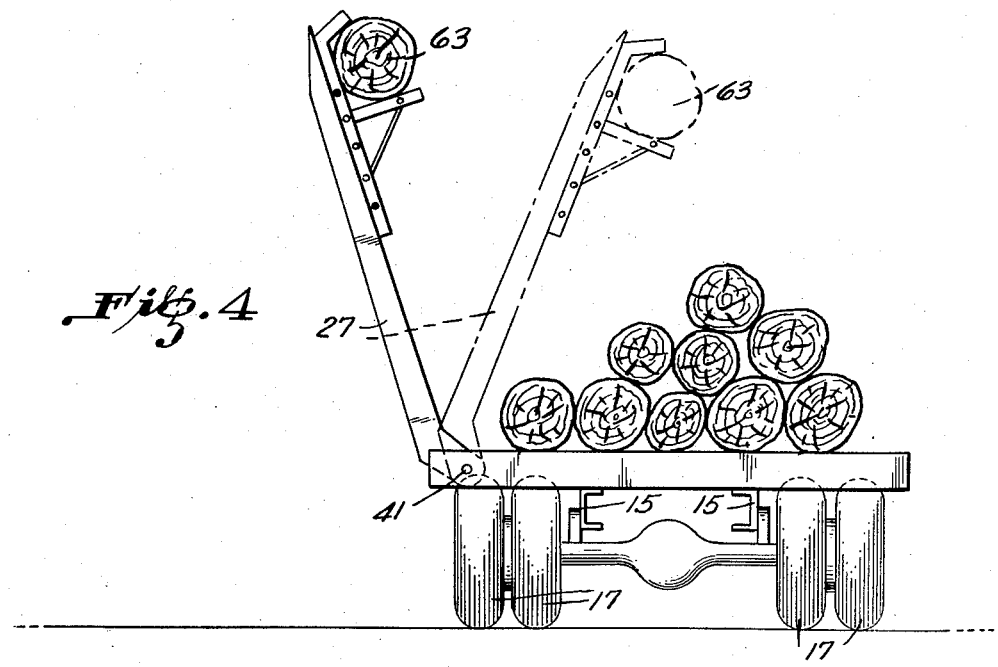

Sept. 23, 1958 O. G. DOUGLAS 2,853,198
LOG LOADING DEVICE
Filed Jan. 4, 1957 4 Sheets-Sheet 3
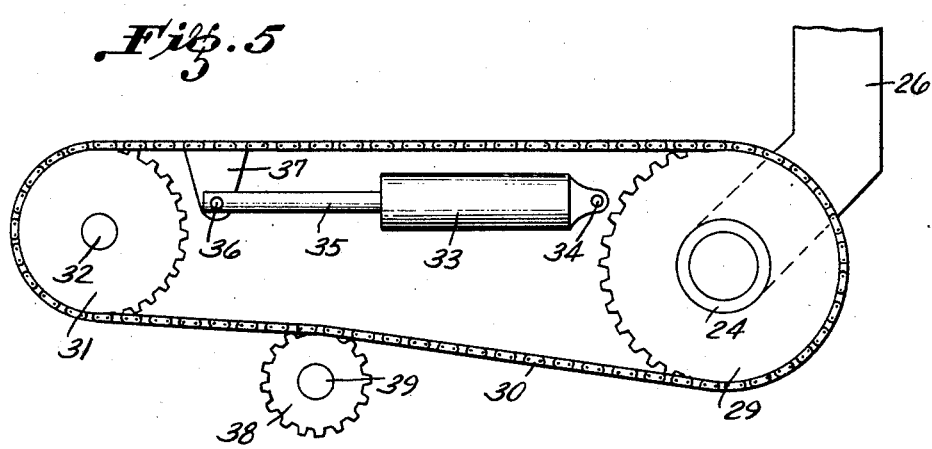
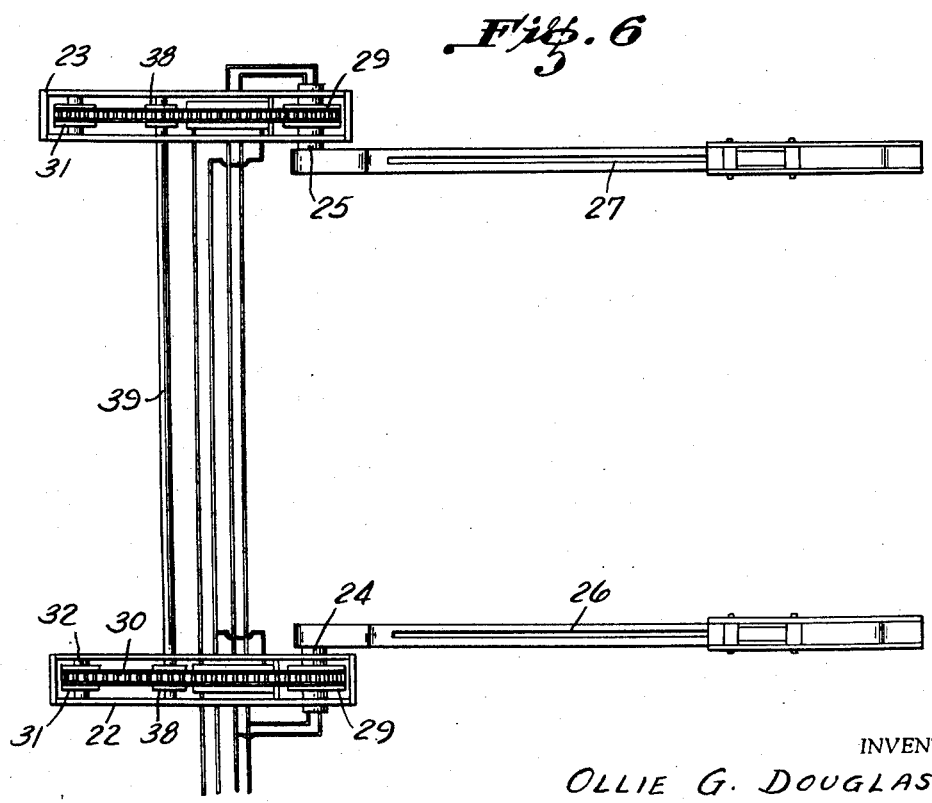
INVENTOR
OLLIE G. DOUGLAS
BY Wilkinson, Mawhinney & Thibault
ATTORNEYS Sept. 23, 1958
O. G. DOUGLAS
2,853,198
LOG LOADING DEVICE
Filed Jan. 4, 1957
4 Sheets-Sheet 4
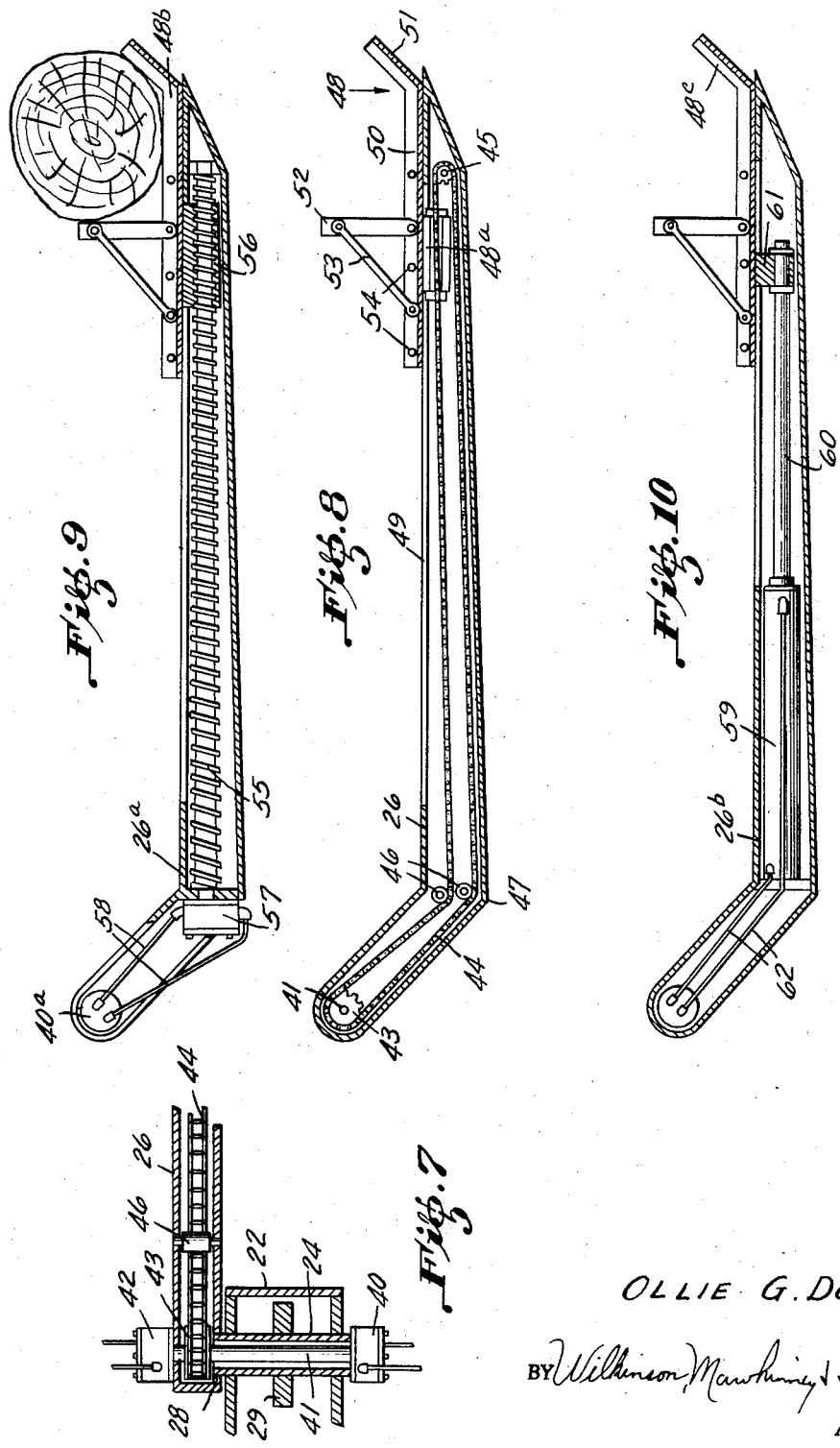
INVENTOR
OLLIE G. DOUGLAS
BY Wilkinson, Mawhinney & Thiebault
ATTORNEYS

United States Patent Office 2,853,198
Patented Sept. 23, 1958

2,853,198
LOG LOADING DEVICE

Ollie G. Douglas, Elizabethtown, Ky., assignor of one-fourth to Edward Gunning and one-fourth to Joseph D. Gunning, both of Elizabethtown, Ky.

Application January 4, 1957, Serial No. 632,515

2 Claims. (Cl. 214—77)

The present invention relates to log loading device and has for an object to provide a device for elevating logs from the ground to an elevated truck body or other elevated support in which the skid arms are pivoted to the support at one end thereof and adapted to assume an inclined position in the first instance to facilitate rolling the log up on the lower end of the arms while the same are in contact with the ground, and in which a movable carrier is mounted upon the arms to receive the log with means to shift the carrier back and forth in a controlled manner to the end that when the logs are first rolled on to the arms and carrier such carrier may be moved upwardly along the inclined arms toward the fulcrum point thereof in order to reduce the leverage and the work required to swing the arms up about the pivotal points, and thereafter the carrier may be elevated on the arms which are in the raised position in order to bring the log to the load level.

Another object of the invention is to achieve the purposes and results above stated by power mechanism, for instance hydraulic motors which may receive the hydraulic fluid from the truck tractor or other desired source.

A further object of the invention is to provide a simple form of arm and built in movable carrier constituting a unit which may be readily hingedly connected to any type truck body and more particularly to a 6 x 6 army surplus type truck having two sets of rear axles and dual wheels grouped together, this being probably the most popular logging truck for rough terrain.

With the foregoing and other objects in view, the invention will be more fully described hereinafter, and will be more particularly pointed out in the claims appended hereto.

In the drawings, wherein like symbols refer to like or corresponding parts throughout the several views:

Figure 3 is an end elevational view of an army surplus truck of the type mentioned showing the skid device or arms in the lower inclined position and with a log received in the carrier which is at the lower ends of the arms.

Figure 4 is a similar view showing in full lines the arms elevated and the carrier also in the elevated position and in dotted lines the arms moved forward to discharging position.

Figure 5 is a side elevational view with one of the arms broken away and showing one form of arm raising mechanism.

Figure 6 is a plan view of a device employing two of the arms and showing a form of mechanism for swinging the arms up and down and also for elevating and lowering the log carriers on the arms.

Figure 7 is an enlarged fragmentary horizontal sectional view taken through an arm and its operating mechanism and also illustrating a form of elevating mechanism for the log carrier.

Figure 8 is a longitudinal sectional view through an arm having a carrier operating mechanism pursuant to Figure 7.

Figure 9 is a longitudinal sectional view of a modified form of arm and log carrier operating mechanism.

Figure 10 is a longitudinal sectional view of a further modified form of arm and mechanism therein for moving the carrier up and down.

Figure 1:
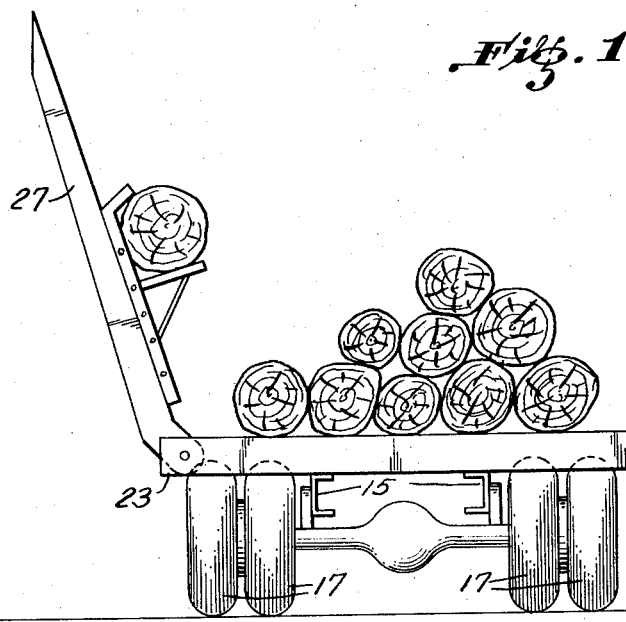
Figure 1 is an end elevational view of a support or truck showing a log loading device constructed in accordance with the present invention and the skid or arms in a partially raised position.

Referring more particularly to the drawings, 15 designates a truck body as exemplary of any support which is adapted to be pulled by a tractor 16 of the type above mentioned having the dual wheels 17 at each side thereof.

The device is preferably operated by hydraulic mechanism and the tractor 16 may carry a tank 18 for hydraulic fluid which is connected to a control valve 19 also conveniently carried by the tractor at the rear end thereof and at one side for convenience in access. Hydraulic lines 20 and 21 connect the tank 18 with the control valve 19 and the control valve 19 with hydraulic motor carrier upon the truck as hereinafter described.

Forming a part of the truck body or later incorporated therein are bolsters 22 and 23 which extend transversely of the truck body preferably at the front and rear portions thereof and substantially spaced from the dual wheels 17 both forwardly and rearwardly. These bolsters are transversely arranged and extend sufficiently out laterally from the truck body to accommodate shafts 24 and 25 which are in axial alignment and stand out with ample clearance from the wheels 17. These shafts 24 and 25 are journaled in any suitable bearings in bolsters 22 and 23 and their axes extend parallel with the longitudinal center line of the truck.

Loading arms 26, 27 are affixed to the shafts 24, 25.

Figure 7 shows the mechanism for driving the arm 26, similar mechanism being employed to drive the companion arm 27 in accompaniment therewith. This Figure 7 shows that the bolsters 22, 23 are hollow, for which also see Figure 6, and that the shafts 24, 25 are also hollow and are connected fixedly as indicated at 28 in Figure 7 to the respective arms 26, 27. In Figure 7 the hollow shaft 24 is shown as having fixedly mounted thereon a sprocket 29 which is accommodated within an outer end portion of the hollow bolster 22.

Referring more particularly to Figure 5, trained over the sprocket 29 is a chain 30 which is endless and also passes about a second sprocket 31 mounted upon a shaft 32 which is journaled in the hollow bolster 22 at a point remote from the sprocket 29.

Figure 2:
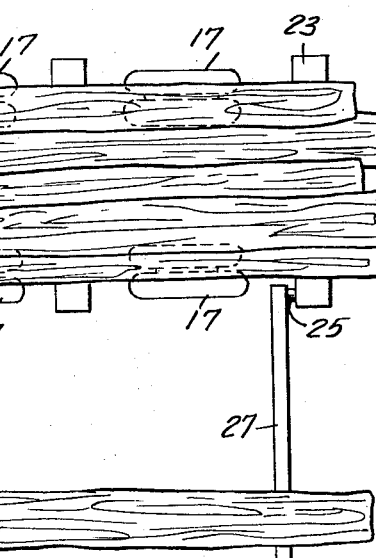
Figure 2 is a top plan view of the same showing the loading device or arms in the lowered position with a log just received thereon.

A hydraulic cylinder 33 is pivoted at 34 within the hollow bolster 22 and between the two runs of the chain 30. The movable plunger rod 35 which constitutes with the cylinder 33 a hydraulic ram or motor has its end remote from the cylinder 33 pivoted at 36 to a stirrup or other fixed connection which is fastened to the chain 30. When hydraulic fluid is introduced into the cylinder 33 the plunger 35 will be moved to the outer position illustrated in Figure 5 in which case the connected arm 26 is raised. When hydraulic fluid is evacuated from the cylinder 33, or when it is introduced into the opposite end of the cylinder 33 so as to drive the plunger in the opposite direction, the chain 30 will be correspondingly moved, rotating the socket 29 and the arm 26 down to the lower position as shown in Figures 2 and 3.

The chain 30 in each bolster 22, 23 is contacted by an equalizing sprocket 38 and a single shaft 39 is affixed to both sprockets 38 and extends across between the two bolsters 22, 23 as shown in Figure 6.

The equalizing shaft 39 compels the mechanisms in both bolsters to move the two arms or standards 26, 27 up and down in unison.

Referring to Figure 7, 41 designates a carrier drive shaft which may be journaled in appropriate bearings through the hollow shaft 24 and extends outwardly beyond the arm 26 where hydraulic motor 42 is affixed to the shaft 41 for the purpose of rotating the same. A second hydraulic motor 40 may be affixed to the other end of the shaft 41 for the same purpose.

Referring more particularly to Figure 8 in connection with Figure 7, 43 designates a sprocket affixed to the shaft 41 within the arm 26 which is hollow, such sprocket 43 being engaged to drive an endless chain 44 which engages about a sprocket 45 journaled to freely rotate at the outer free end of the arm 26. At an intermediate portion the chain 44 passes about idlers 46 in an elbow 47 of the arm 26.

Referring more particularly to Figure 8 a log cradle or carrier 48 is mounted for movement longitudinally of the arm 26 and a web 48ª of the carrier is affixed to the upper run of the belt 44 through a slot 49 in the arm, the web and the side walls of the slot forming a guideway for the movement of the carrier back and forth.

Such carrier may be of any desired form, for instance comprising a bed 50 having an inclined outer end 51 and an adjustable abutment 52 reinforced by a diagonal brace 53. Holes 54 in the bed may accommodate bolts or other fastenings by which the abutement 52 and brace 53 are connected at selected spaced points from the inclined outer end 51 to accommodate logs of different sizes.

By controlling the rotation of the hydraulic motor 42 directionally the sprocket 43 may be rotated in one or the other direction to drive the chain 44 to shift the log carrier or cradle 48 lengthwise of the arm toward and from the hinging fulcrum 41 thereof. It will be understood that similar apparatus is mounted in the other arm 27 and in the companion bolster 23.

An alternative form for shifting the log carrier along the arm is shown in Figure 9, in which a worm shaft 55 is shown as journaled longitudinally in the arm 26ª, such worm having a travelling nut 56 thereon which is held from rotation but is connected to the cradle 48ᵇ, whereby rotation of the worm shaft 55 will cause the nut 56 to progress back and forth along such shaft carrying the cradle 48ᵇ therewith. The worm shaft 55 may be driven by a hydraulic motor 57 which is supplied with fluid by the hydraulic lines 58.

Referring more particularly to Figure 10 wherein a further modified form of cradle operating mechanism is shown, 59 designates a hydraulic cylinder for moving the piston rod 60 in and out, the piston rod being connected to a web 61 depending from the log cradle 48ᶜ, which web projects through a slot in the arm 26ᵇ. At 62 are shown hydraulic lines for bringing fluid to the cylinder 59 and evacuating fluid therefrom.

One mode of operation of the device is as follows, by suitable manipulation of the hydraulic control valves 19 the skid device comprising the two or more arms 26, 27 may be lowered to the position illustrated in Figures 2 and 3 where the skid inclines downwardly from the platform of the truck so that the lower free end of the skid may rest upon the ground and is preferably inclined for this purpose to facilitate the rolling of a log 63 up on the carrier 48, it being understood that through the control and drive mechanism above described that both cradles or carriers of both arms will have been moved to the lower position shown in full lines in Figure 3, at which positions it is convenient to load the log 63 directly upon the skid in this lowermost position and to also load the log directly upon the cradle or carrier.

Then before the skids or arms are raised the internal mechanism of the arm is operated to move the carrier or cradle from the full line position of Figure 3 to substantially the dotted line position thereof. In so doing the log 63 will be lifted through a preliminary distance but what is more important it will be brought closer to the fulcrum axis about which the arms are subsequently raised and it will thus be in a more favorable mechanical position for the lifting operation. In other words it will decrease the leverage and the power required to lift the arms and log up to the position illustrated in Figure 1. On reaching the position of Figure 1 the internal mechanism of the arms may be again operated to move the cradle or log carrier upwardly of the arms toward the free ends thereof, or in other words to the full line position of Figure 4. This is of course exemplary only as Figure 4 shows the full limit of the movement of the carrier on the arm in an upward direction. In the case of the logs first to be deposited upon an empty platform or truck body it may not be necessary to elevate the carrier on the arms when the arms have reached an elevated position. However as the load on the truck increases it will be necessary to raise the carrier to increased heights to bring new logs to a deposit level on top of the logs already deposited in the truck.

When the log is to be discharged the arms or skid is swung over to the dotted line position of Figure 4 where upon the log will be permitted to descend upon the truck or other support or upon logs already loaded thereupon.

It will be understood that while the loader was primarily built for loading logs it will be apparent that there are many other uses for the unit. No special type of truck is required as this device is adaptable to any truck or possibly tractors and trailers, such as are pulled by crawler type tractors.

The arms 26 and 27 are moved up and down by the power source illustrated in Figure 5. The arms are both raised and lowered by this power source which has positive action in both directions, that is, the arms do not descend by gravity are lowered by hydraulic power. The force of this power is as great, or almost as great, on the downward stroke as when the loaded log is being lifted onto the bed. It is conceivable that under some circumstances this action could be beneficial in the handling of logs other than in loading them, or in soft earth or rough terrain.

Although I have disclosed herein the best form of the invention known to me at this time, I reserve the right to all such modifications and changes as may come within the scope of the following claims.

What is claimed is:

1. A log loading device comprising a skid pivoted to an elevated log support and adapted to extend downwardly therefrom with its free end lowermost, a log carrier movable back and forth on the skid and adapted to be run down to the free end portion of the downwardly inclined skid to receive a log, means to thereafter move the carrier to an elevated position on the skid near the pivotal axis thereof to reduce the leverage and work required to lift the log on to the platform, means for subsequently raising the skid, means for thereafter elevating the log carrier on the skid, and means for subsequently further pivotally moving the skid to log discharge position.

2. A log loading device as claimed in claim 1 in which the skid is hollow and the carrier moving means is within the hollow skid and has a part projecting outwardly of the hollow skid connected to the carrier.

References Cited in the file of this patent

UNITED STATES PATENTS

| | | |
|---|---|---|
| 2,357,600 | Pabst | Sept. 5, 1944 |
| 2,711,259 | Jones | June 21, 1955 |
| 2,720,130 | Chang | Oct. 11, 1955 |
| 2,735,327 | Ritter | Feb. 21, 1956 |